(12) United States Patent
Ko et al.

(10) Patent No.: US 10,012,206 B2
(45) Date of Patent: Jul. 3, 2018

(54) RUNNER VANE OF AXIAL HYDRAULIC MACHINE, RUNNER OF AXIAL HYDRAULIC MACHINE, AND AXIAL HYDRAULIC MACHINE

(71) Applicant: KABUSHIKI KAISHA TOSHIBA, Minato-ku (JP)

(72) Inventors: Pohan Ko, Yokohama (JP); Koji Hamaguchi, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 348 days.

(21) Appl. No.: 14/963,711

(22) Filed: Dec. 9, 2015

(65) Prior Publication Data

US 2016/0245256 A1 Aug. 25, 2016

(30) Foreign Application Priority Data

Feb. 24, 2015 (JP) ................................. 2015-034231

(51) Int. Cl.
*F03B 3/12* (2006.01)
*F03B 3/04* (2006.01)
*F03B 3/06* (2006.01)

(52) U.S. Cl.
CPC ................ *F03B 3/123* (2013.01); *F03B 3/04* (2013.01); *F03B 3/06* (2013.01); *F03B 3/121* (2013.01); *Y02E 10/223* (2013.01); *Y02E 10/226* (2013.01)

(58) Field of Classification Search
CPC .... F03B 3/123; F03B 3/04; F03B 3/06; F03B 3/121; F03B 3/14; F03B 3/145; Y02E 10/223; Y02E 10/226
See application file for complete search history.

(56) References Cited

U.S. PATENT DOCUMENTS 5,441,384 A * 8/1995 Gokhman ............... F03B 3/183
  415/148
6,007,297 A   12/1999 Buchelt
(Continued)

FOREIGN PATENT DOCUMENTS

DE   102010011708 A1 * 9/2011 ............... F01D 5/12
JP   7-54752 A   2/1995
(Continued)

OTHER PUBLICATIONS

Machine Translation of DE 102010011708 [retrieved on Jan. 12, 2018]. Retrieved from: Espacenet.*
(Continued)

*Primary Examiner* — Igor Kershteyn
*Assistant Examiner* — Eric Zamora Alvarez
(74) *Attorney, Agent, or Firm* — Oblon, McClelland, Maier & Neustadt, L.L.P.

(57) ABSTRACT

A runner vane of an axial hydraulic machine according to embodiments described herein includes a center-side vane part provided on a radial center side and defined by a center-side camber line, and a boss-side vane part provided at a side edge on a side of a runner boss and defined by a boss-side camber line. As determined by the flow direction of a turbine, a curvature of an upstream side portion of the boss-side camber line is larger than a curvature of an upstream side portion of the center-side camber line. An upstream end of the boss-side vane part is positioned on a side of a rotation direction of a runner in comparison with an upstream end of the center-side vane part when viewed toward a downstream side along a rotation axis line of the runner.

9 Claims, 8 Drawing Sheets

(56) References Cited

U.S. PATENT DOCUMENTS 8,092,189 B2 *   1/2012   Ishii ........................ F04D 3/00
                                                          416/242
2014/0322004 A1  10/2014  Kurosawa et al.

FOREIGN PATENT DOCUMENTS

| JP | 2001-234843 A | 8/2001 |
| JP | 2005-171869 A | 6/2005 |
| JP |   2011-1936 A | 1/2011 |

OTHER PUBLICATIONS

Machine Translation of JP 2011001936 [retrieved on Jan. 11, 2018]. Retrieved from: Espacenet.*
Extended European Search Report dated Oct. 17, 2016 in Patent Application No. 15199751.7.

* cited by examiner

RUNNER VANE OF AXIAL HYDRAULIC MACHINE, RUNNER OF AXIAL HYDRAULIC MACHINE, AND AXIAL HYDRAULIC MACHINE

CROSS-REFERENCE TO RELATED APPLICATIONS

This application is based upon and claims the benefit of priority from Japanese Patent Application No. 2015-034231, filed Feb. 24, 2015; the entire contents of which are incorporated herein by reference.

FIELD

Embodiments described herein relate generally to a runner vane of an axial hydraulic machine, a runner of the axial hydraulic machine, and the axial hydraulic machine.

BACKGROUND

An axial hydraulic machine has been developed for many years, and performance of the axial hydraulic machine has been significantly improved. On the other hand, an operation for satisfying desired economic requirements, for example, operation at a flow rate which is different from a design point, is increased in frequency. Thus not only efficiency improvement of the axial hydraulic machine, but also long life, low vibration, or low noise of the machine are required, and improvement on cavitation performance is increasingly required. Although the improvement on the cavitation performance has been developed for many years, it is still an important development theme.

Improving the cavitation performance and securing efficiency of an axial hydraulic machine are conflicted. Specifically, to improve the cavitation performance, flowing water pressure applied on a runner vane, especially a suction surface thereof, is preferably larger than a saturated vapor pressure at every operation points within a predetermined operation range. In this manner, when a pressure on the suction surface is increased, occurrence of cavitation can be suppressed. However, due to pressure increase on the suction surface, a pressure difference between a pressure surface and the suction surface of a runner vane can be reduced. Therefore, a rotation torque of a runner is reduced since a force applied to the runner vane is reduced. As a result, the efficiency of the hydraulic machine might be reduced. As described above, it is difficult to compatibly achieve to improve cavitation performance and secure the efficiency of the hydraulic machine.

DETAILED DESCRIPTION

A runner vane of an axial hydraulic machine according to embodiments described herein is provided between a runner boss connected to a rotary main shaft and a shroud surrounding a runner. The runner vane of the axial hydraulic machine includes a center-side vane part provided on a radial center side and defined by a center-side camber line, and a boss-side vane part provided at a side edge on a side of a runner boss and defined by a boss-side camber line. As determined by the flow direction of a turbine, a curvature of an upstream side portion of the boss-side camber line is larger than a curvature of an upstream side portion of the center-side camber line. An upstream end of the boss-side vane part is positioned on a side of a rotation direction of a runner in comparison with an upstream end of the center-side vane part when viewed toward a downstream side along a rotation axis line of the runner.

A runner vane of an axial hydraulic machine according to the embodiments is provided between a runner boss connected to a rotary main shaft and a shroud surrounding a runner. The runner vane of the axial hydraulic machine includes a center-side vane part provided on a radial center side and defined by a center-side camber line, and a shroud-side vane provided at a side edge on a side of a shroud and defined by a shroud-side camber line. As determined by the flow direction of a turbine, a curvature of an upstream side portion of the shroud-side camber line is larger than a curvature of an upstream side portion of the center-side camber line. An upstream end of the shroud-side vane is positioned on a side opposite to a rotation direction of a runner in comparison with an upstream end of the center-side vane part when viewed toward a downstream side along a rotation axis line of the runner.

The runner of the axial hydraulic machine according to the embodiments includes a runner boss and the above-described runner vane of the axial hydraulic machine.

The axial hydraulic machine according to the embodiments includes a shroud, and the above-described runner of the axial hydraulic machine.

The embodiments of the present invention will be described below with reference to the drawings.

First Embodiment

A runner vane of an axial hydraulic machine, a runner of the axial hydraulic machine, and the axial hydraulic machine according to a first embodiment of the present invention will be described by using FIGS. 1 to 6.

First, the axial hydraulic machine will be described. Herein, a Kaplan turbine will be described as an example of the axial hydraulic machine.

Figure 1:
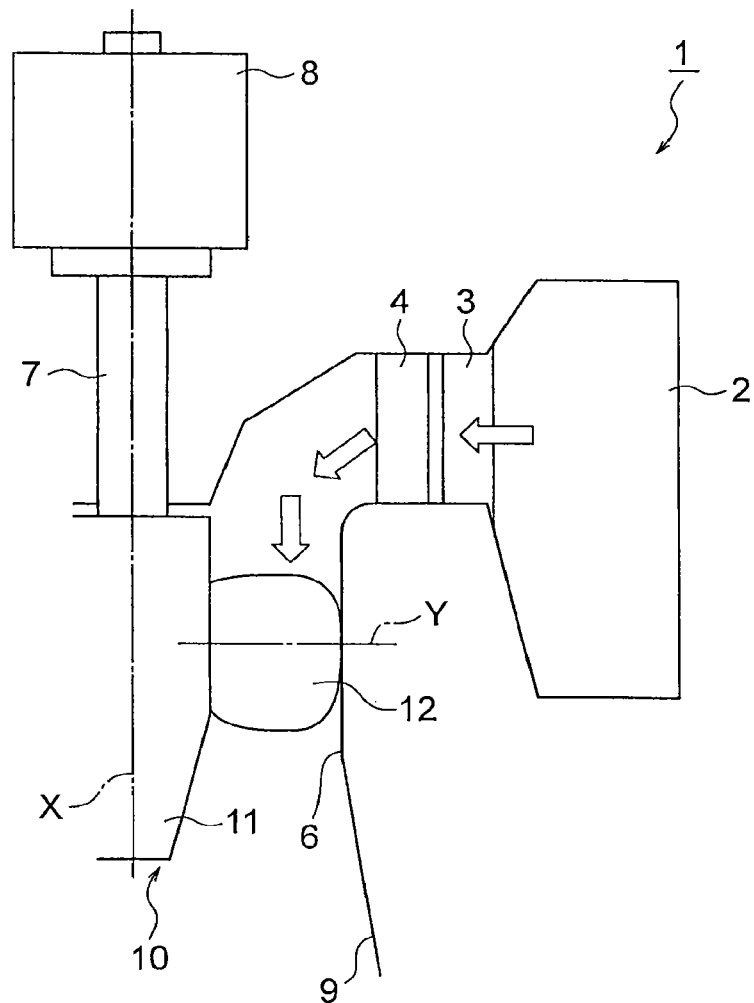
FIG. 1 is a view illustrating a configuration of a Kaplan turbine according to a first embodiment.

As illustrated in FIG. 1, a Kaplan turbine 1 includes a casing 2 and a runner 10 of an axial hydraulic machine (hereinafter, simply called a runner 10). Water flows from an upper reservoir (not illustrated) to the casing 2. The runner 10 is provided rotationally with respect to the casing 2 and rotationally driven by water flowing from the casing 2 to the runner 10 through a stay vane 3 and a guide vane 4.

The stay vane 3 forms a channel from the casing 2 to the runner 10 and is disposed on an inner peripheral side than the casing 2. The guide vane 4 forms a channel to the runner 10 and adjusts a flow rate of water flowing to the runner 10. The guide vane 4 is disposed on an inner peripheral side than the stay vane 3. By changing an opening angle of the guide vane 4, a flow rate of water flowing from the casing 2 to the runner 10 is adjusted, and a generation amount by a generator 8 to be described later is changed.

The runner 10 is disposed on an inner peripheral side and a lower side than the guide vane 4. Main flow of water flowing from the casing 2 (see thick arrows in FIG. 1) flows in a substantially radial direction in the stay vane 3 and the guide vane 4. However, the main flow flows in a direction of a rotation axis line X (a vertical direction) in the runner 10. Further, the runner 10 is surrounded by a shroud 6 (discharge ring) provided on an outer peripheral side thereof and forming a part of the Kaplan turbine 1. The shroud 6 defines a channel of water flowing in the runner 10.

The generator 8 is connected to the runner 10 via a rotary main shaft 7. When the runner 10 is rotationally driven by water entered into the runner 10, the generator 8 generates power.

A draft tube 9 is provided on a downstream side of the runner 10. The draft tube 9 is connected to a lower reservoir (not illustrated), and the water which has rotationally driven the runner 10 is discharged to the lower reservoir.

Next, the runner 10 according to the embodiment will be described.

Figure 2:
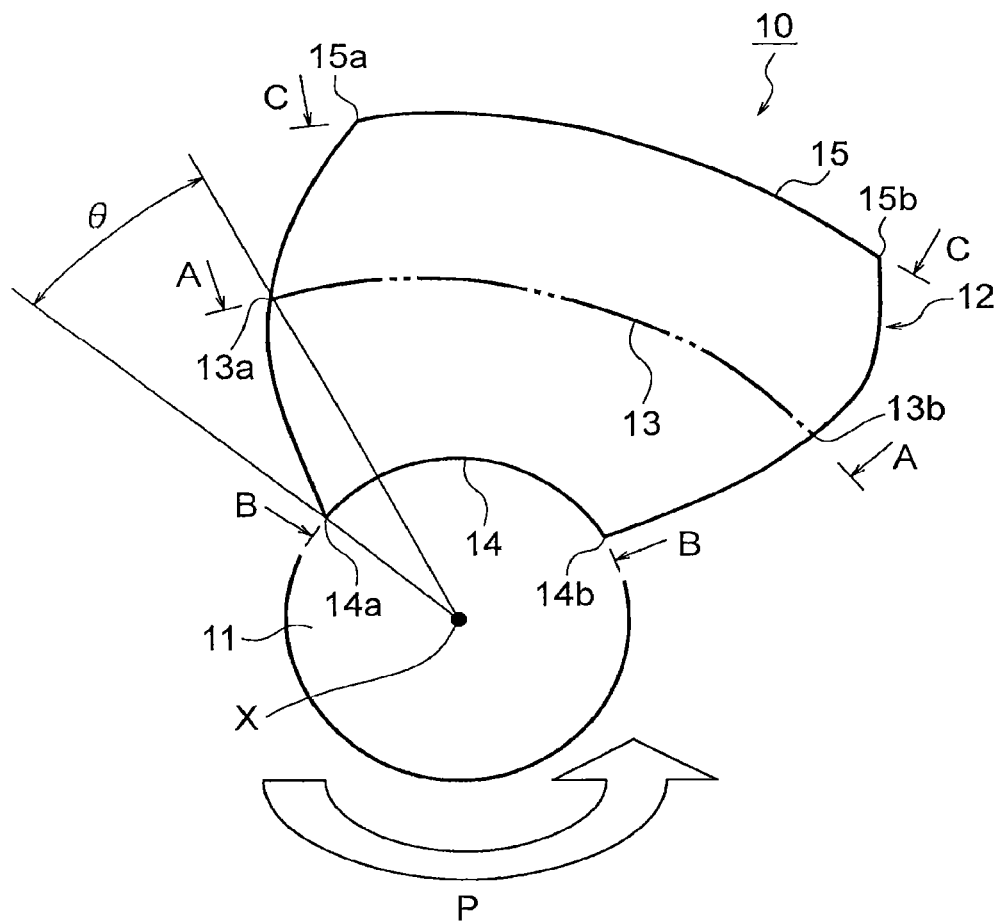
FIG. 2 is a top view of a runner of the Kaplan turbine illustrated in FIG. 1.

As illustrated in FIGS. 1 and 2, the runner 10 includes a runner boss 11 and a runner vane 12 of an axial hydraulic machine (hereinafter, simply called a runner vane 12). The runner boss 11 is connected to the above-described rotary main shaft 7. The runner vane 12 is provided between the runner boss 11 and the shroud 6. The runner boss 11 rotates around the rotation axis line X by interlocking with the rotary main shaft 7.

The runner vanes 12 are disposed at predetermined intervals in a circumferential direction. A channel, in which a water flows, is formed between the runner vanes 12 so that the runner vanes 12 receive pressure from the water flow. Further, the runner vane 12 is turnable about a turning axis line Y vertical to the rotation axis line X with respect to the runner boss 11. When each runner vane 12 turns, an angle of the runner vane 12 is adjusted in accordance with a flow rate of water flowing to the runner 10, and efficiency of a hydraulic machine can be improved.

Since the runner 10 is configured as described above, the runner 10 is rotationally driven around the rotation axis line X when the runner vane 12 receives pressure from water flowing to the runner 10. A rotation torque of the runner 10 is transmitted to the generator 8 via the rotary main shaft 7. Therefore, the runner vane 12 is a member largely relating to efficiency of the Kaplan turbine 1. On the other hand, the runner vane 12 might have cavitation, and therefore the runner vane 12 is a member largely relating to cavitation performance Next, the runner vane 12 according to the embodiment will be described.

Figure 3:
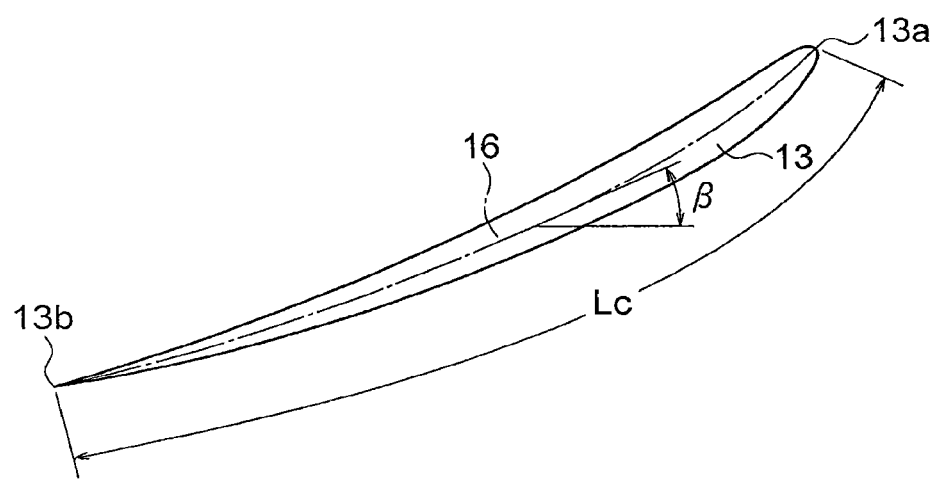
FIG. 3 is an A-A line sectional view illustrating a center-side vane part illustrated in FIG. 2.
Figure 4:
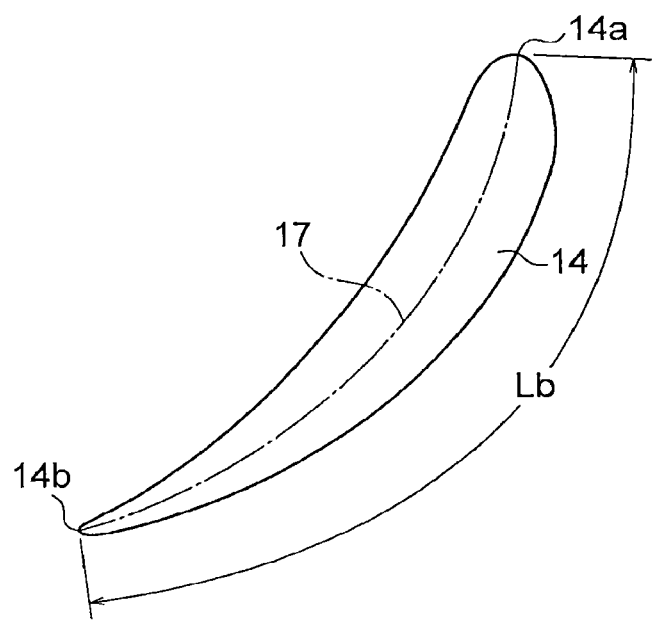
FIG. 4 is a B-B line sectional view illustrating a boss-side vane part illustrated in FIG. 2.
Figure 7:
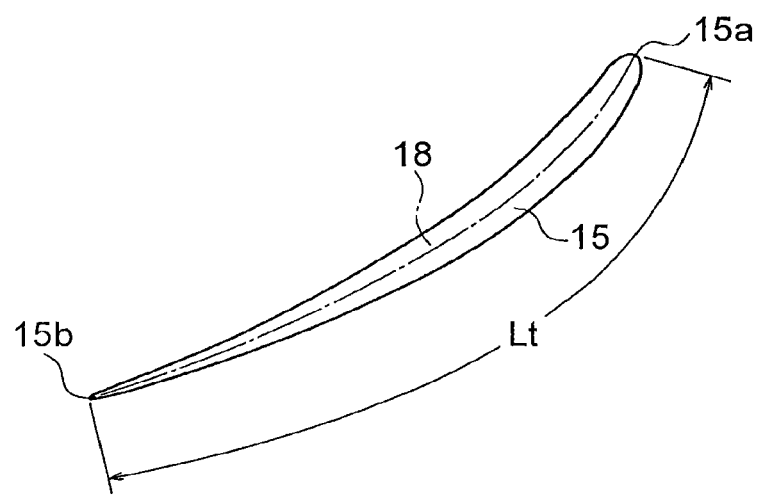
FIG. 7 is a C-C line sectional view illustrating a shroud-side vane illustrated in FIG. 2 in a runner vane according to a second embodiment.

As illustrated in FIG. 2, the runner vane 12 includes a center-side vane part 13, a boss-side vane part 14, and a shroud-side vane part 15. The center-side vane part 13 is provided on a radial center side. The boss-side vane part 14 is provided at a side edge on a side of the runner boss 11. The shroud-side vane 15 is provided at a side edge on a side of the shroud 6. Among them, the center-side vane part 13 is defined by the center-side camber line 16 as illustrated in FIG. 3. The boss-side vane part 14 is defined by the boss-side camber line 17 as illustrated in FIG. 4. The shroud-side vane 15 is defined by the shroud-side camber line 18 as illustrated in FIG. 7 to be described later. Thus, the center-side vane part 13 is disposed between the boss-side vane part 14 and the shroud-side vane 15 as illustrated in FIG. 2. Further, the boss-side vane part 14 is disposed between the runner boss 11 and the center-side vane part 13 and positioned close to the runner boss 11. The shroud-side vane 15 is disposed between the shroud 6 and the center-side vane part 13 and positioned close to the shroud 6. The runner vane 12 is formed in a steam-line form, and therefore the center-side vane part 13, the boss-side vane part 14, and the shroud-side vane 15 are smoothly connected. Further, a camber line means a line connecting a center of an inscribed circle coming into contact with both of a pressure surface and a suction surface of the runner vane 12.

A camber angle formed by each camber line 16 to 18 and a horizontal surface (representatively $\beta$ illustrated in FIG. 3) of the runner vane 12 is reduced toward a downstream side along a vane length. Accordingly, each camber line 16 to 18 is curved and receives pressure from water flowing into the runner 10. In the embodiment, the camber angles are formed so as to differ each other at different positions in radial direction of the runner vane 12.

Figure 5:
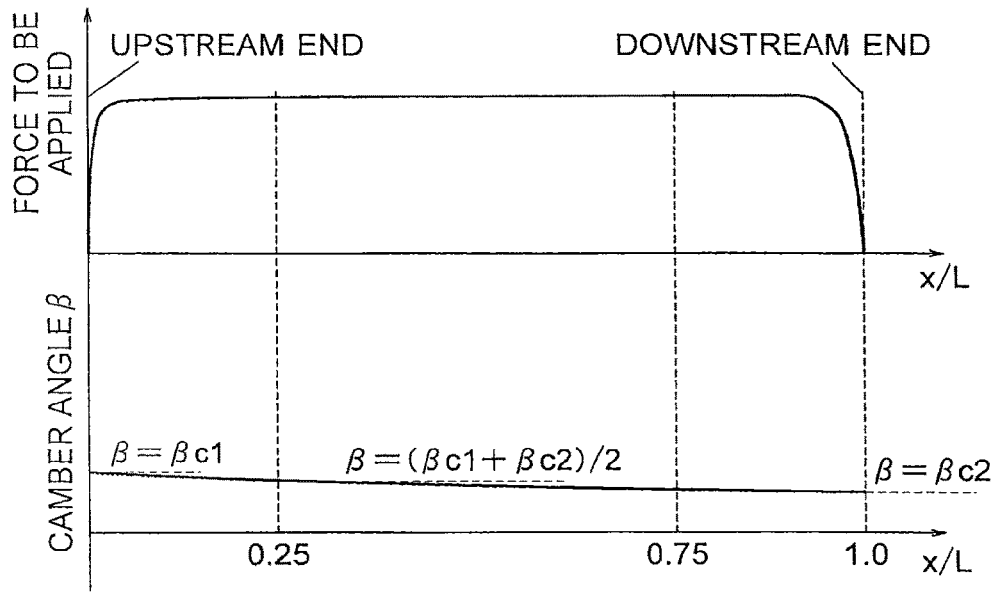
FIG. 5 is a graph illustrating distribution of a force applied to the center-side vane part and a camber angle illustrated in FIG. 3.
Figure 6:
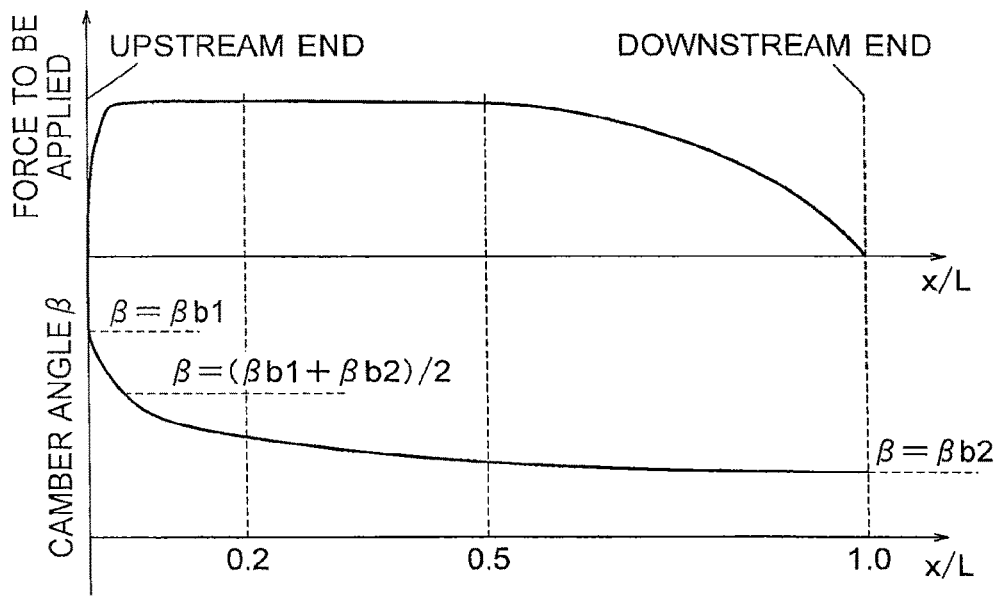
FIG. 6 is a graph illustrating distribution of a force applied to the boss-side vane part and a camber angle illustrated in FIG. 4.

Specifically, as illustrated in FIGS. 3 to 6, as determined by the flow direction of a turbine, a curvature of an upstream side portion of the boss-side camber line 17 is larger than a curvature of an upstream side portion of the center-side camber line 16. In other words, a curvature radius of an upstream side portion of the boss-side camber line 17 is smaller than a curvature radius of an upstream side portion of the center-side camber line 16. Accordingly, a camber angle of the boss-side camber line 17 at an upstream end 14a of the buss-side vane 14 is larger than a camber angle of the center-side camber line 16 at an upstream end 13a of the center-side vane part 13, and relatively largely inclined with respect to a horizontal surface. In this manner, a camber angle $\beta b1$ of the boss-side camber line 17 at the upstream end 14a illustrated in FIG. 6 is larger than a camber angle $\beta c1$ of the center-side camber line 16 at the upstream end 13a illustrated in FIG. 5. Herein, a scale of the camber angle illustrated in FIG. 5 is the same as a scale of the camber angle illustrated in FIG. 6.

As described above, a curvature of an upstream side portion of the center-side camber line 16 is relatively small. The curvature of the center-side camber line 16 will be more specifically described by using FIG. 5.

In the embodiment, as illustrated in FIG. 5, in the case where a total vane length of the center-side vane part 13 is denoted by Lc, a camber angle of the center-side camber line 16 at the upstream end 13a of the center-side vane part 13 is denoted by $\beta c1$, and a camber angle of the center-side camber line 16 at a downstream end 13b of the center-side vane part 13 is denoted by $\beta c2$, a position xc where a camber angle of the center-side camber line 16 is denoted by $(\beta c1+\beta c2)/2$ is within a range of $0.25<(xc/Lc)<0.75$ from the upstream end 13a. Accordingly, the position where the camber angle is denoted by $(\beta c1+\beta 2)/2$ is separated from the upstream end 13a of the center-side vane part 13, an angle change in an upstream side portion of the center-side camber line 16 is reduced, and a curvature of the upstream side portion of the center-side camber line 16 is reduced.

On the other hand, a curvature of an upstream side portion of the boss-side camber line 17 is relatively increased. The curvature of the boss-side camber line 17 will be more specifically described by using FIG. 6.

In the embodiment, as illustrated in FIG. 6, in the case where a total vane length of the boss-side vane part 14 is denoted by Lb, a camber angle of the boss-side camber line 17 at the upstream end 14a of the boss-side vane part 14 is denoted by $\beta b1$, and a camber angle of a downstream end 14b of the boss-side vane part 14 is denoted by $\beta b2$, a position xb where a camber angle of the boss-side camber line 17 is denoted by $(\beta b1+\beta b2)/2$ is within a range of $0<(xb/Lb)<0.2$ from the upstream end 14a. Accordingly, the position where the camber angle is denoted by $(\beta b1+\beta b2)/2$ comes close to the upstream end 14a of the boss-side vane part 14, an angle change in an upstream side portion of the boss-side camber line 17 is increased, and a curvature of the upstream side portion of the boss-side camber line 17 is increased.

Further, as illustrated in FIG. 2, the upstream end 14a of the boss-side vane part 14 is positioned on a side of a rotation direction P of the runner 10 in comparison with the upstream end 13a of the center-side vane part 13 when viewed toward a downstream side (downward) along the rotation axis line X. In this case, in the case where an angle formed by a line segment connecting a rotation center of the runner boss 11 (the rotation axis line X) and the upstream end 14a of the boss-side vane part 14 and a line segment connecting the rotation center and the upstream end 13a of the center-side vane part 13 is denoted by $\theta$, $\theta$ is equal to or larger than 0 ($\theta \geq 0$).

Next, an action of the embodiment including such a configuration will be described.

In the case where the Kaplan turbine 1 according to the embodiment is operated as a turbine operation, water flows from an upper reservoir (not illustrated) into the casing 2 (see FIG. 1). The water entered into the casing 2 flows from the casing 2 to the runner 10 through the stay vane 3 and the guide vane 4. The runner 10 is rotationally driven by the water entered into the runner 10. Thus, the generator 8 connected to the runner 10 is driven and generates power. The water entered into the runner 10 is discharged from the runner 10 to a lower reservoir (not illustrated) through the draft tube 9.

The water entered into the runner 10 flows in a direction along each camber line of the runner vane 12 (see FIG. 2).

In this case, since a curvature of an upstream side portion of the center-side camber line 16 is relatively reduced, it is prevented that acceleration flow is locally formed at the center-side vane part 13. Accordingly, local pressure drop is prevented, and occurrence of cavitation is prevented.

On the other hand, a curvature of an upstream side portion of the boss-side camber line 17 is relatively increased. However, the upstream end 14a of the boss-side vane part 14 is positioned on an upstream side in comparison with the upstream end 13a of the center-side vane part 13. Therefore, relatively large pressure is applied to an upstream side portion of the boss-side vane part 14 by flowing water entered into the runner 10. Accordingly, it is prevented that acceleration flow is locally formed at the boss-side vane part 14.

While water is flowing in the runner 10, as illustrated in FIG. 5, a force from the flowing water is almost uniformly applied over the total vane length of the center-side vane part 13. On the other hand, since a curvature of an upstream side portion of the boss-side camber line 17 is large, a force to be applied to the area from a center portion to an upstream side portion in the boss-side vane part 14 is increased as illustrated in FIG. 6.

As described above, according to the embodiment, a curvature of an upstream side portion of the boss-side camber line 17 is larger than a curvature of an upstream side portion of the center-side camber line 16. Accordingly, local pressure drop can be prevented in the center-side vane part 13, and occurrence of cavitation can be prevented. A further large force can be applied to the boss-side vane part 14 from flowing water entered into the runner 10, and a rotation torque of the runner 10 can be increased. Further, since the upstream end 14a of the boss-side vane part 14 is positioned on a side of the rotation direction P of the runner 10 in comparison with the upstream end 13a of the center-side vane part 13, occurrence of cavitation can be prevented by preventing local pressure drop on the boss-side vane part 14. Therefore, cavitation performance can be improved, and also efficiency of the Kaplan turbine 1 can be secured.

Second Embodiment

Next, a runner vane of an axial hydraulic machine, a runner of the axial hydraulic machine, and the axial hydraulic machine according to a second embodiment of the present invention will be described by using FIGS. 7 to 9.

Figure 8:
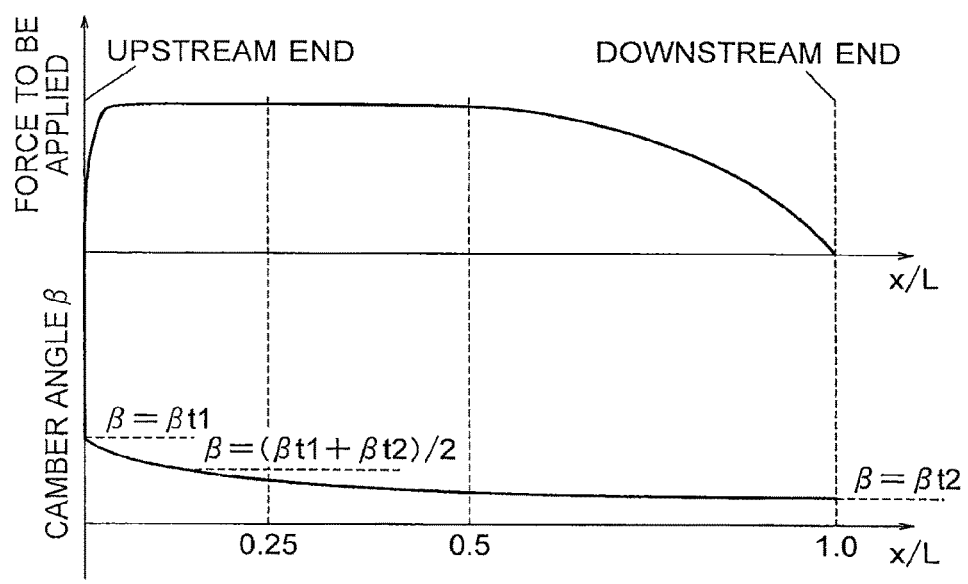
FIG. 8 is a graph illustrating distribution of a force applied to the shroud-side vane and a camber angle illustrated in FIG. 7.
Figure 9:
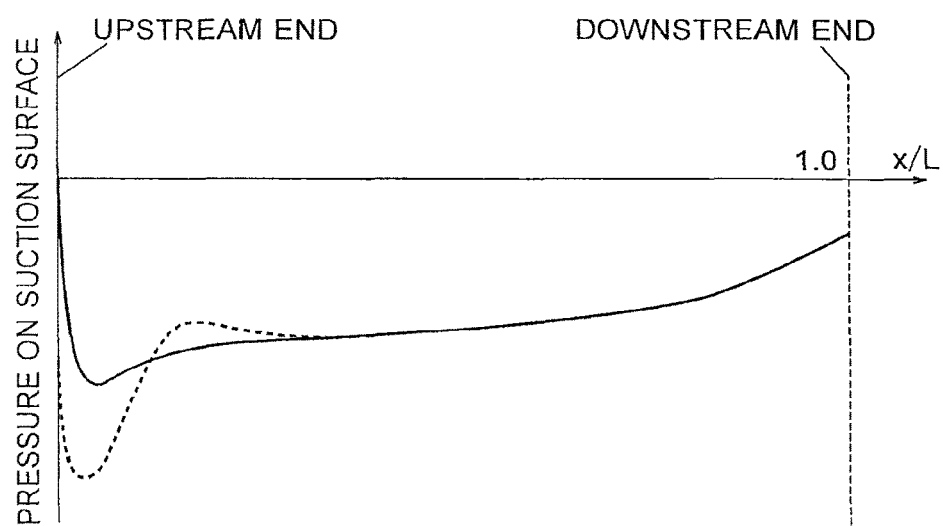
FIG. 9 is a graph illustrating distribution of a pressure on a suction surface of the center-side vane part illustrated in FIG. 3.

In the second embodiment illustrated in FIGS. 7 to 9, configurations are significantly the same as the configurations of the first embodiment illustrated in FIGS. 1 to 6 mainly other than that a curvature of an upstream side portion of a shroud-side camber line is larger than a curvature of an upstream side portion of a center-side camber line. The portions which are the same as those in the first embodiment illustrated in FIGS. 1 to 6 are denoted by the same reference signs in FIGS. 7 to 9, and detailed descriptions thereof are omitted.

As illustrated in FIGS. 7 and 8, as determined by the flow direction of a turbine, a curvature of an upstream side portion of a shroud-side camber line 18 is larger than a curvature (see FIG. 5) of an upstream side portion of the center-side camber line 16. In other words, a curvature radius of an upstream side portion of the shroud-side camber line 18 is smaller than a curvature radius of an upstream side portion of the center-side camber line 16. Accordingly, a camber angle of the shroud-side camber line 18 at an upstream end 15a of the shroud-side vane 15 is larger than a camber angle of the center-side camber line 16 at an upstream end 13a of the center-side vane part 13, and the camber angle of the shroud-side camber line 18 is relatively largely inclined with respect to a horizontal surface. In this manner, a camber angle $\beta t1$ of the shroud-side camber line 18 at the upstream end 15a illustrated in FIG. 8 is larger than a camber angle $\beta c1$ of the center-side camber line 16 at the upstream end 13a illustrated in FIG. 5. Herein, a scale of the camber angle illustrated in FIG. 8 is the same as a scale of the camber angle illustrated in FIG. 5.

As described above, a curvature of an upstream side portion of the shroud-side camber line 18 is relatively increased. The curvature of the shroud-side camber line 18 will be more specifically described by using FIG. 8.

In the embodiment, as illustrated in FIG. 8, in the case where a total vane length of the shroud-side vane 15 is denoted by Lt, a camber angle of the shroud-side camber line 18 at the upstream end 15a of the shroud-side vane 15 is denoted by $\beta t1$, and a camber angle of a downstream end 15b of the shroud-side vane 15 is denoted by $\beta t2$, a position xt where a camber angle of the shroud-side camber line 18 is denoted by $(\beta t1+\beta t2)/2$ is within a range of $0<(xt/Lt)<0.25$ from the upstream end 15a. Accordingly, a position where the camber angle is denoted by $(\beta t1+\beta t2)/2$ comes close to the upstream end 15a of the shroud-side vane 15, an angle change in an upstream side portion of the shroud-side camber line 18 is increased, and a curvature of the upstream side portion of the shroud-side camber line 18 is increased.

As illustrated in FIGS. 6 and 8, a curvature of an upstream side portion of the boss-side camber line 17 may be larger than a curvature of an upstream side portion of the shroud-side camber line 18.

Further, as illustrated in FIG. 2, the upstream end 15a of the shroud-side vane 15 is positioned on a side opposite to the rotation direction P of the runner 10 in comparison with the upstream end 13a of the center-side vane part 13 when viewed toward a downstream side (downward) along a rotation axis line X of the runner 10. For example, the upstream end 15a of the shroud-side vane 15 is preferably positioned on a side opposite to the rotation direction P by 2 to 6% of a total vane length of the shroud-side vane 15 in comparison with the upstream end 13a of the center-side vane part 13.

When the water entered into the runner 10 flows along the camber lines 16 to 18 of a runner vane 12, a curvature of an upstream side portion of the center-side camber line 16 is relatively small. Accordingly, it is prevented that acceleration flow is locally formed at the center-side vane part 13. Therefore, local pressure drop is prevented.

FIG. 9 illustrates the above case. Herein, FIG. 9 illustrates pressure distribution on a suction surface of the center-side vane part 13 in the embodiment. A broken line indicates pressure distribution of a general center-side vane part, a solid line indicates pressure distribution of the center-side vane part 13 according to the embodiment. According to FIG. 9, pressure drop on a suction surface is prevented at an upstream side portion of the center-side vane part 13. In this manner, occurrence of cavitation is prevented at the center-side vane part 13.

On the other hand, a curvature of an upstream side portion of the shroud-side camber line 18 is relatively increased. However, the upstream end 15a of the shroud-side vane 15 is positioned on a downstream side in comparison with the upstream end 13a of the center-side vane part 13. Therefore, pressure applied to the runner vane 12 by flowing water is distributed, and pressure applied to the shroud-side vane 15 by flowing water is reduced. Accordingly, speed change in flowing water in a direction along the shroud-side camber line 18 is relieved, and it is prevented that local acceleration flow is formed.

As described above, since a curvature of an upstream side portion of the shroud-side camber line 18 is increased, the shroud-side vane 15 is formed on a radial outer side (tip side) in the case where the rotation axis line X is a center. Accordingly, while water flows in the runner 10, as illustrated in FIG. 8, a force to be applied over the area from a center portion to an upstream side portion in the shroud-side vane 15 is increased.

As described above, according to the embodiment, a curvature of an upstream side portion of the shroud-side camber line 18 is larger than a curvature of an upstream side portion of the center-side camber line 16. Accordingly, local pressure drop can be prevented in the center-side vane part 13, and occurrence of cavitation can be prevented. A further large force can be applied to the shroud-side vane 15 by water flowing to the runner 10, and a rotation torque of the runner 10 can be increased. Further, since the upstream end 15a of the shroud-side vane 15 is positioned on a side opposite to the rotation direction P in comparison with the upstream end 13a of the center-side vane part 13, occurrence of cavitation can be prevented by preventing local pressure drop on the shroud-side vane 15. Therefore, cavitation performance can be improved, and also efficiency of the Kaplan turbine 1 can be secured.

In the above-described embodiment, an example has been described in which a curvature of an upstream side portion of the boss-side camber line 17 is larger than a curvature of an upstream side portion of the center-side camber line 16, and a curvature of an upstream side portion of the shroud-side camber line 18 is larger than an upstream side portion of the center-side camber line 16. However, without being limited to the above, a curvature of an upstream side portion of the boss-side camber line 17 may not be larger than a curvature of an upstream side portion of the center-side camber line 16. In this case, in the center-side vane part 13, occurrence of cavitation can be prevented. In the shroud-side vane 15, a further large force from flowing water can be applied to the runner 10, and occurrence of cavitation can be prevented by preventing local pressure drop. As a result, cavitation performance can be improved, and efficiency of the Kaplan turbine 1 can be secured.

According to the above-described embodiment, cavitation performance can be improved, and also efficiency of a hydraulic machine can be secured.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, it will be understood that these embodiments can be at least partially combined properly without departing from the spirit of the present invention.

In each of the above-described embodiments, a Kaplan turbine has been described as an example of an axial hydraulic machine. However, without being limited to the example, the present invention can be applied to an axial hydraulic machine other than the Kaplan turbine. In addition, the present invention can be also applied to an axial hydraulic machine which can perform a pumping operation.

The invention claimed is:

1. A runner vane of an axial hydraulic machine, the runner vane being provided between a runner boss connected to a rotary main shaft and a shroud surrounding a runner, comprising:
   a center-side vane part provided on a radial center side and defined by a center-side camber line;
   a boss-side vane part provided at a side edge on a side of the runner boss and defined by a boss-side camber line; and
   a shroud-side vane part provided on a side edge on a side of the shroud and defined by a shroud-side camber line,
   wherein, as determined by a flow direction of a turbine, a curvature of an upstream side portion of the boss-side camber line is larger than a curvature of an upstream side portion of the center-side camber line, and an upstream end of the boss-side vane part is positioned on a side in a rotation direction of the runner in comparison with an upstream end of the center-side vane part when viewed toward a downstream side along a rotation axis line of the runner, and wherein a curvature of an upstream side portion of the shroud-side camber line is larger than a curvature of an upstream side portion of the center-side camber line.

2. The runner vane of the axial hydraulic machine according to claim 1, wherein, in a case where a total vane length of the center-side vane part is denoted by Lc, an angle of the center-side camber line at an upstream end of the center-side vane part is denoted by $\beta c1$, and the angle of the center-side camber line at a downstream end of the center-side vane part is denoted by $\beta c2$, a position xc where an angle of the center-side camber line is denoted by $(\beta c1+\beta c2)/2$ is within $0.25<(xc/Lc)<0.75$ from the upstream end, and in a case where a total vane length of the boss-side vane part is denoted by Lb, an angle of the boss-side camber line at an upstream end of the boss-side vane part is denoted by $\beta b1$, and the angle of the boss-side camber line at a downstream end of the boss-side vane part is denoted by $\beta b2$, a position xb where an angle the boss-side camber line is denoted by $(\beta b1+\beta b2)/2$ is within a range of $0<(xb/Lb)<0.2$ from the upstream end.

3. The runner vane of the axial hydraulic machine according to claim 1, wherein an upstream end of the shroud-side vane part is positioned on a side opposite to the rotation direction of the runner in comparison with an upstream end of the center-side vane part when viewed toward a downstream side along the rotation axis line of the runner.

4. The runner vane of the axial hydraulic machine according to claim 3, wherein a curvature of an upstream side portion of the boss-side camber line is larger than a curvature of an upstream side portion of the shroud-side camber line.

5. A runner of an axial hydraulic machine, comprising:
the runner boss; and
the runner vane of the axial hydraulic machine according to claim 1.

6. An axial hydraulic machine, comprising:
the shroud; and
the runner of the axial hydraulic machine according to claim 5.

7. A runner vane of an axial hydraulic machine, the runner vane being provided between a runner boss connected to a rotary main shaft and a shroud surrounding a runner, comprising:
a center-side vane part provided on a radial center side and defined by a center-side camber line; and
a shroud-side vane part provided at a side edge on a side of the shroud and defined by a shroud-side camber line,
wherein, as determined by a flow direction of a turbine, a curvature of an upstream side portion of the shroud-side camber line is larger than a curvature of an upstream side portion of the center-side camber line, and an upstream end of the shroud-side vane part is positioned on a side opposite to a rotation direction of the runner in comparison with an upstream end of the center-side vane part when viewed toward a downstream side along a rotation axis line of the runner.

8. A runner of an axial hydraulic machine, comprising:
the runner boss; and
the runner vane of the axial hydraulic machine according to claim 7.

9. An axial hydraulic machine, comprising:
the shroud; and
the runner of the axial hydraulic machine according to claim 8.

* * * * *